J. G. MACLAREN.
BLOWER UNLOADING DEVICE.
APPLICATION FILED JAN. 6, 1908.

961,364.

Patented June 14, 1910.

2 SHEETS—SHEET 2.

Witnesses:
L. G. Bartlett
A. L. Messer

Inventor:
James G. Maclaren
by H. Rusk
Attorney.

UNITED STATES PATENT OFFICE.

JAMES G. MACLAREN, OF WEEHAWKEN, NEW JERSEY, ASSIGNOR TO LAMSON CONSOLIDATED STORE SERVICE COMPANY, OF NEWARK, NEW JERSEY, A CORPORATION OF NEW JERSEY.

BLOWER-UNLOADING DEVICE.

961,364.

Specification of Letters Patent. Patented June 14, 1910.

Application filed January 6, 1908. Serial No. 409,398.

*To all whom it may concern:*

Be it known that I, JAMES G. MACLAREN, of Weehawken, in the county of Hudson and State of New Jersey, have invented certain new and useful Improvements in Blower-Unloading Devices, of which the following is a specification.

My invention relates to improvements in blower unloading devices and is particularly adapted for use in connection with pneumatic despatch tube systems.

The object of this invention is to intermittently load and unload the blower, that is, to allow the blower to run normally free, and when it is desired to load the same the blower is automatically thrown into communication with the load.

In connection with despatch tube systems when it is desired to despatch carriers the blower is thrown into communication with the transmission tubes and when the carriers have delivered the blower is automatically thrown out of communication with the system and allowed to run free.

Numerous other features of my invention are herein described and particularly pointed out in the claims.

In the accompanying drawings is illustrated a construction embodying my invention in which:—

Figure 1:
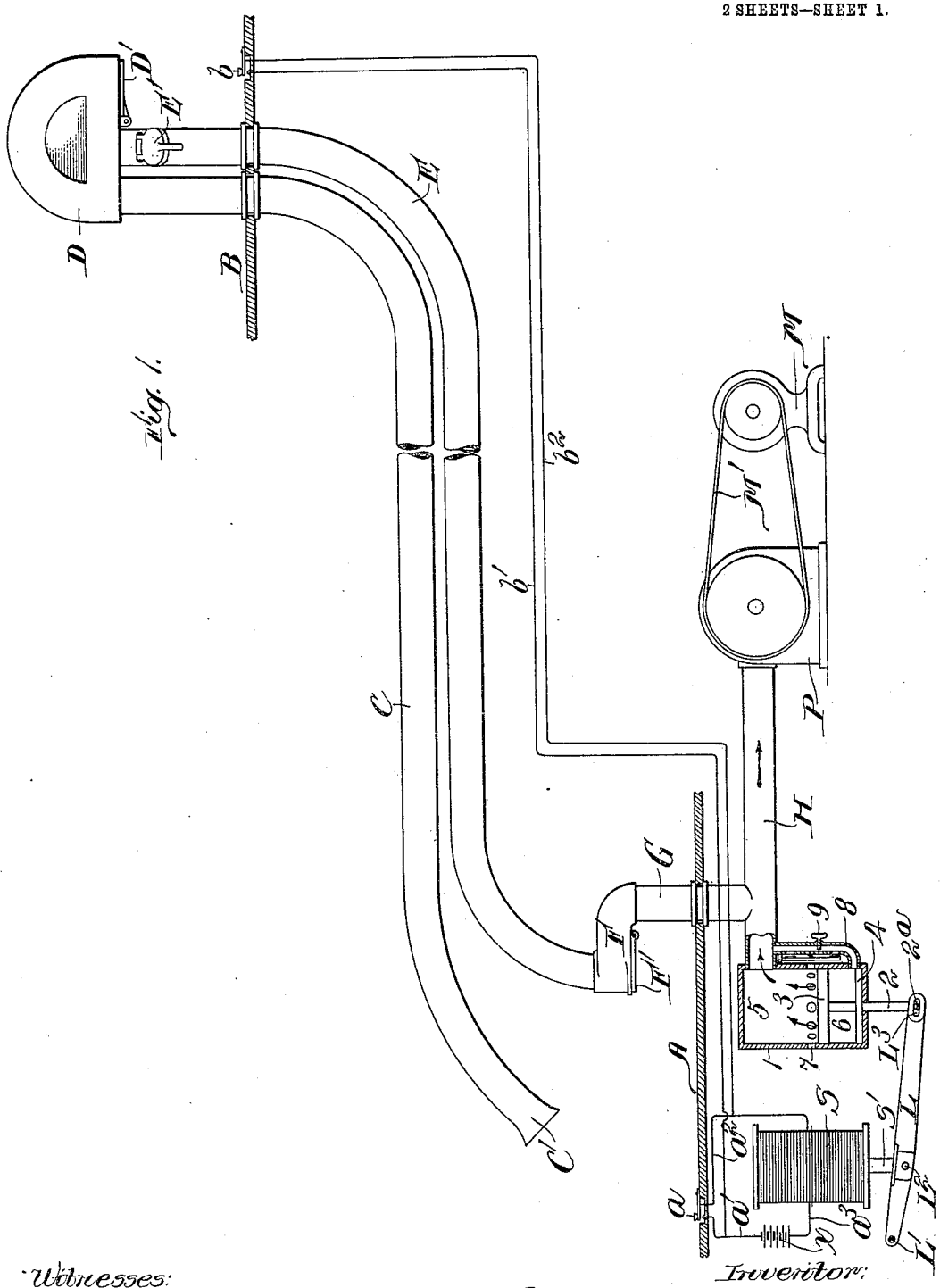
Figure 2:
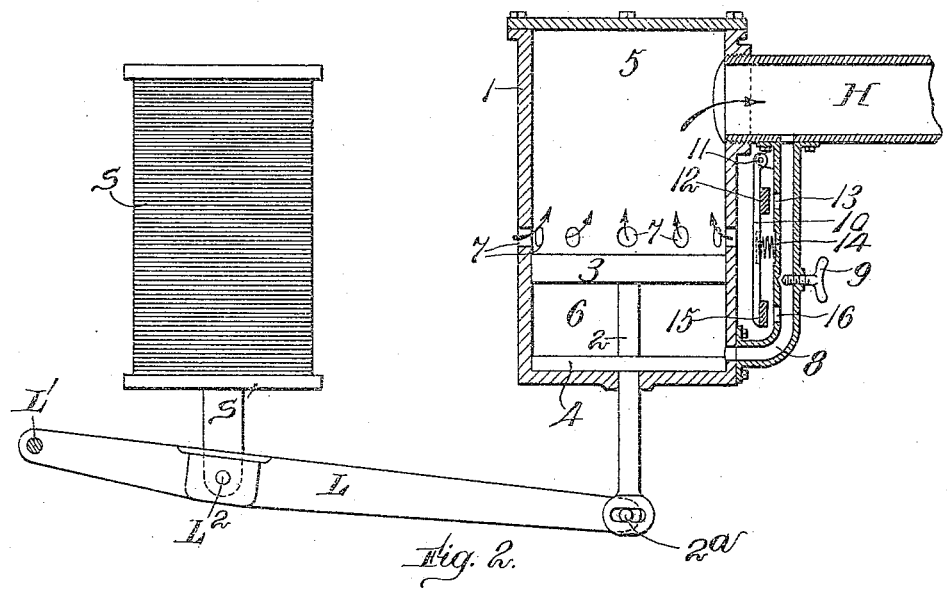
Figure 3:
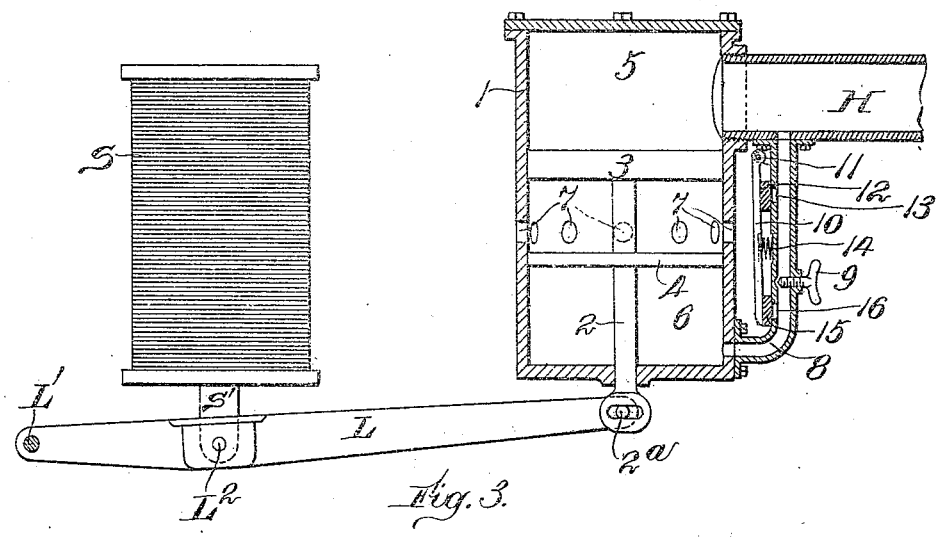

Figure 1 is a diagrammatic view, partly in section, of the device in connection with a pneumatic despatch tube system. Fig. 2 is an enlarged sectional elevation of the device showing the mechanism in normal position with blower unloaded. Fig. 3 is a similar view to Fig. 2 and showing the position of the mechanism with the blower loaded.

Like characters of reference refer to like parts throughout the several views.

Referring to Fig. 1, C represents a tube for the transmission of carriers connecting the station A with the ordinary discharge terminal D controlled by the usual valve D' at the station B.

E is a transmission tube for the return of carriers and connects the terminal D with the terminal F controlled by the usual valve F' at station A.

G is a tube connecting the terminal F with the conduit or air supply pipe H which is connected at one end with the cylinder 1 and at the other end with the vacuum connection of a blower P.

M is an electric motor adapted to drive the blower P through a belt M' at a constant speed.

S is a solenoid magnet having an armature S' pivoted to lever L at $L^2$, said lever L being stationarily pivoted at one end at L', the opposite or movable end having a slot $L^3$.

$2^a$ is a pin fixed to the lower end of a piston rod 2 and mounted in the slot $L^3$, and 3 and 4 are pistons mounted in the cylinder 1 and secured to the upper end of rod 2. Ports 7 in cylinder 1 are adapted to normally supply air to chamber 5 and conduit H.

8 is a by-pass connecting the conduit H with the chamber 6 in lower part of cylinder 1 beneath piston 4 and is controlled by an adjustable timing valve 9. 13 and 16 are ports in said by-pass 8 and are controlled respectively by valves 12 and 15 mounted on the arm 10 pivoted at one end at 11. A spring 14 is adapted to normally hold valves 12 and 16 away from ports 13 and 16.

The normally open switches *a* and *b* are located at stations A and B respectively and are adapted to energize the magnet S. The circuit controlled by switch *a* is as follows,—from battery X through wire *a'*, switch *a*, wire $a^2$, magnet S, and back to battery X through wire $a^3$. Switch B is in multiple with circuit of switch *a* through wires *b'* and $b^2$.

The operation of the device is as follows:—To despatch a carrier from station A to station B, with the parts in normal position and the blower moving at a constant speed and taking air through ports 7 and conduit H (see Figs. 1 and 2), the operator closes the switch *a* and inserts the carrier into the bellmouth C'. The closing of switch *a* energizes the solenoid magnet S attracting and moving the armature S' upward and moving lever L together with the piston rod 2 and pistons 3 and 4, thereby cutting off the flow of air through ports 7 and conduit H to blower P (see Fig. 3). The air now entering the bellmouth C' and flowing through tubes C, E and G to conduit H and blower P drives the carrier through tube C toward station B. The upward movement of the pistons 3 and 4 is unrestricted owing to the admission of air through port 16 and by-pass 8 to chamber 6. The operator now releases the switch or button *a* breaking the circuit and deënergizing the magnet S and releasing armature S'.

The vacuum in the conduit H and by-pass 8 above timing valve 9 is now sufficient to actuate valve 12 and lever 10 against the action of spring 14 causing the valves 12 and 15 to close ports 13 and 16 respectively. The admission of air through ports 13 and 16 being cut off, the vacuum acts through by-pass 8 to gradually exhaust the air from chamber 6 allowing the pistons 3 and 4 to drop by gravity until by the time the carrier has delivered at station B the valve 3 has uncovered ports 7 (see Figs. 1 and 3) short circuiting the flow of air and unloading the blower P. The vacuum in the by-pass 8 now being destroyed the valves 12 and 15 are opened by the tension of spring 14. The timing valve 9 may be adjusted to time the drop of pistons 3 and 4, (and consequent short circuiting of the air current) to the proper interval necessary for the transmission and delivery of the carrier.

In despatching a carrier from station B to station A the operator inserts the carrier into the inlet E' and closes the switch b energizing the magnet S, the air currents being established in a manner identical with that heretofore described and the carrier delivering at station A.

Having thus described my invention and set forth a construction embodying the same, what I claim as new and desire to secure by Letters Patent of the United States, is:—

1. In an apparatus of the character herein described, a constantly operating pressure producing member normally communicating with the atmosphere, a receptacle or conduit, means for switching said member into communication with said receptacle or conduit, and means for automatically switching said member from communication with said conduit to the atmosphere.

2. In an apparatus of the character herein described, a constantly operating pressure producing member normally communicating with the atmosphere, a receptacle or conduit, means for switching said member into communication with said receptacle or conduit, means for automatically switching said member from communication with said conduit to the atmosphere, and means for timing the communication of said member with said receptacle or conduit.

3. In a pneumatic despatch tube apparatus, a constantly operating blower or pump normally communicating with the atmosphere, a tube for the transmission of carriers, and means for switching said blower or pump into communication with said transmission tube to establish a current of air through said tube for the transmission of carriers.

4. In a pneumatic despatch tube apparatus, a tube for the transmission of carriers, a constantly operating blower or pump, means normally connecting said blower with the atmosphere, means for throwing said blower into communication with said transmission tube to establish a current of air through said tube for the transmission of carriers, and means for automatically throwing said blower into communication with the atmosphere.

5. In a pneumatic despatch tube apparatus, a constantly operating blower or pump normally communicating with the atmosphere, a tube for the transmission of carriers, a conduit or connection between said blower or pump and said transmission tube provided with an air inlet, means normally permitting the admission of air through said inlet and conduit to said blower, and means for closing said inlet and for switching said blower into communication with said transmission tube to establish a current of air through said tube for driving carriers therethrough.

6. In a pneumatic despatch tube apparatus, a tube for the transmission of carriers, a blower or pump, a conduit or connection between said blower or pump and said transmission tube provided with an air inlet, means normally permitting the admission of air through said inlet and conduit to said blower, means for closing said inlet to establish a current of air through said transmission tube for driving carriers therethrough, and means for automatically opening said air inlet and short circuiting the current of air to the atmosphere.

7. In a pneumatic despatch tube apparatus, a tube for the transmission of carriers, a blower or pump, a conduit or connection between said blower or pump and said transmission tube provided with an air inlet, means normally permitting the admission of air through said inlet and conduit to said blower, means for closing said inlet to establish a current of air through said transmission tube for driving carriers therethrough, means normally urging the opening of said inlet, and means for timing the opening of said inlet and the short circuiting of said air current.

In testimony whereof, I have signed my name to this specification in the presence of two subscribing witnesses, this thirty-first day of December A. D. 1907.

JAMES G. MACLAREN.

Witnesses:
 WM. HEPPERLE,
 ELSIE MACLAREN.